United States Patent [19]

Coppa

[11] Patent Number: 4,633,566
[45] Date of Patent: Jan. 6, 1987

[54] APPARATUS AND METHOD FOR CONSTRUCTING AND DISASSEMBLING A TRUSS STRUCTURE

[75] Inventor: Anthony P. Coppa, Merion, Pa.

[73] Assignee: General Electric Company, Philadelphia, Pa.

[21] Appl. No.: 719,866

[22] Filed: Apr. 4, 1985

[51] Int. Cl.[4] .................. B23P 11/00; B23P 19/04; B64G 1/00; B64G 1/10

[52] U.S. Cl. .................... 29/429; 29/155 R; 29/430; 29/467; 29/700; 29/822; 52/638; 52/646; 52/648; 244/158 R; 244/159; 403/171; 403/174; 403/176; 403/178; 403/218; 403/219; 414/786

[58] Field of Search ............... 29/155 R, 429, 430, 29/464, 467, 700, 822, 823, 824; 52/81, 633, 637, 638, 646, 648, 726; 403/170, 171, 174, 176, 178, 217, 218, 219; 244/158 R, 159; 414/786

[56] References Cited

U.S. PATENT DOCUMENTS

| | | | |
|---|---|---|---|
| 3,221,464 | 12/1965 | Miller | 52/655 |
| 4,259,821 | 4/1981 | Bush | 52/309.1 |
| 4,308,699 | 1/1982 | Slysh | 52/108 |
| 4,334,816 | 6/1982 | Slysh | 244/159 X |
| 4,337,560 | 7/1982 | Slysh | 29/155 R |
| 4,395,004 | 7/1983 | Ganssle et al. | 244/158 R |
| 4,480,415 | 11/1984 | Truss | 244/159 X |
| 4,524,552 | 6/1985 | Hujsak | 244/158 R X |

FOREIGN PATENT DOCUMENTS

| | | | |
|---|---|---|---|
| 48312 | 12/1983 | European Pat. Off. | 244/159 |
| 354919 | 7/1961 | Switzerland | 29/155 R |

Primary Examiner—Howard N. Goldberg
Assistant Examiner—Ronald S. Wallace
Attorney, Agent, or Firm—Allen E. Amgott

[57] ABSTRACT

Apparatus and method for constructing and disassembling a triangular prism-form truss structure in spaced are disclosed. The apparatus includes a triangular prism-form construction fixture and three feed units disposed about the fixture for feeding the triangular frame elements that form the basic unit of the structure, or for removing the elements from the structure. The construction method, essentially automatic, comprises feeding frame elements to the fixture from the feed units in sequence. Fixture forward and backward movement along the fixture longitudinal axis, before and after element feeding, effects fastening of the frame elements to one another. Shifting of completed truss structure sections relative to the fixture is accomplished by periodic axial movement of the fixture. The disassembly method essentially comprises the reverse sequence of the steps of the construction method.

24 Claims, 16 Drawing Figures

APPARATUS AND METHOD FOR CONSTRUCTING AND DISASSEMBLING A TRUSS STRUCTURE

The present invention relates in general to apparatus and method for constructing and disassembling truss structures, and more specifically where such construction or disassembly is to be carried on in a gravity-free environment such as outer space.

BACKGROUND OF THE INVENTION

Because of their structural efficiency, certain forms of structures are preferred for use in space where considerations of size, weight and transportability are important. Among these are truss structures, which have a high stiffness-to-weight ratio and a simple, self-determined geometry. Since structures of substantial size are not transportable into space but must be erected on site, it is a primary requirement that the method and apparatus employed be as simple as possible and that it preferably enable construction and disassembly from a single general location. Further, the stowage efficiency of the structure must be high for purposes of transport.

It is also desirable that the construction be automated to the greatest extent possible in order to minimize the requirement for human participation. Further, considerations of weight and efficiency dictate that the equipment for carrying out such automated construction in space be light and relatively small, or be capable of being transported in disassembled condition. Also, for purposes of repairing the truss structure, or in applications where the use of the truss structure is temporary, it is desirable that the construction apparatus also be capable of disassembling the built-up truss structure.

Structures currently in use, or proposed for use, in space are subject to a number of disadvantages. Self-deployable structures which automatically unfold and position themselves in space are generally not efficient and frequently carry a weight penalty because of the self-deployment feature. Also, structures which are capable of automated construction in space often fail to achieve the necessary stiffness-to-weight ratio, stowage efficiency and the requisite simplicity of the assembly method and apparatus. Further, existing structures for use in space typically fail to provide assembly from a single general location.

By way of example, U.S. Pat. No. 4,337,560 to Slysh discloses a structure that lends itself to an automated assembly technique, but is subject to several disadvantages. In particular, the structure disclosed in the Slysh patent is incapable of construction from one fixed, general location. To overcome this deficiency, Slysh provides an assembler trolley which must crawl along the erected structure, somewhat analogous to the elevators employed in the construction of a high rise building, as the structure is built up during construction. Such apparatus not only adds to the weight that must be transported into space, but it materially increases the complexity of constructing a structure in space.

OBJECTS OF THE INVENTION

It is a principal object of the present invention to provide new and improved apparatus and method for constructing a truss structure in space which is not subject to the aforementioned problems and disadvantages.

Another object of the present invention is to provide automated apparatus and method for constructing a truss structure in space.

A further object of the present invention is to provide automated apparatus that is relatively light in weight and simple to operate for constructing a truss structure in space.

An additional object of the present invention is to provide automated apparatus that is physically compact for constructing a truss structure in space.

Yet another object of the present invention is to provide automated apparatus and method capable of both constructing and disassembling a truss structure in space.

Yet a further object of the present invention is to provide apparatus and method for constructing a truss structure in space that possesses a high structural efficiency.

Yet an additional object of the present invention is to provide apparatus for constructing a truss structure in space which, together with the structural elements from which the truss is to be constructed, occupies minimal stowage space during transport.

Still a further object of the present invention is to provide apparatus and method for constructing a truss structure in space that is relatively simple to assemble.

Still an additional object of the present invention is to provide apparatus and method for constructing a truss structure in space from a single, general location.

SUMMARY OF THE INVENTION

The foregoing objects of the present invention are achieved by means of new and improved apparatus and method for constructing and disassembling a prism-form truss structure in space from planar, congruent, triangular frame elements. The construction apparatus comprises a prism-form construction fixture having a triangular cross section which conforms to the truss structure to be constructed around the fixture. The apparatus further includes three frame feed units fixedly disposed at locations 120° apart around the longitudinal axis of the construction fixture and axially spaced from one another. Each frame feed unit is capable of holding a stack of triangular elements and delivering them seriatim to the construction fixture where they are held pending attachment to the truss structure portion already completed.

The above-recited method for constructing the truss structure is essentially automatic. The fixture and truss structure are capable of relative axial motion. Backward and forward movement of the fixture, together with the truss structure held by the fixture, is carried out in order to fasten additional frame elements to the structure. Forward movement of the truss structure relative to the fixture occurs whenever a bay of the truss structure has been completed and frees a portion of the fixture to accept additional frame elements. For the disassembly of the aforesaid truss structure, the apparatus used remains the same and the process is essentially reversed.

These and other objects of the invention, together with the features and advantages thereof will become apparent from the following detailed description when read together with the accompanying drawings in which applicable reference designations have been carried forward.

DESCRIPTION OF THE DRAWINGS

Figure 1:
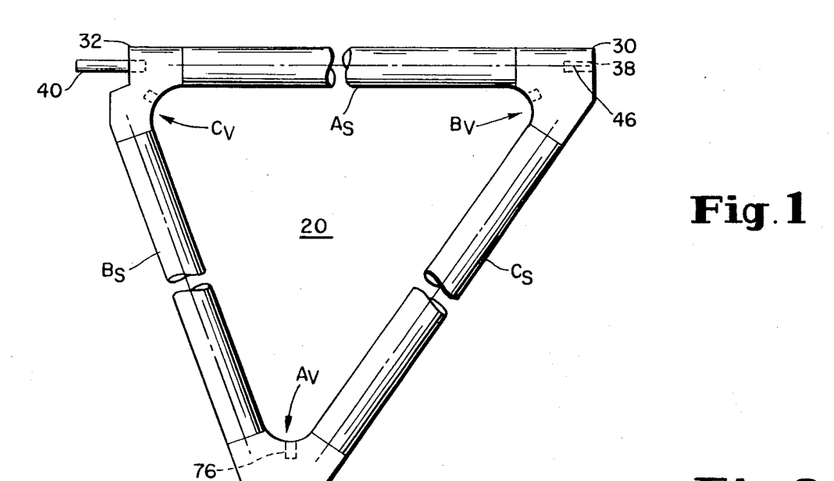
FIG. 1 is a plan view of a frame element of the type used in the construction of the truss structure.

Referring now to the drawings, FIG. 1 illustrates a typical frame element 20 of the type which forms the basic unit for the construction of the truss structure. All frame elements are substantially identical, each being substantially planar and consisting of an A-side $A_S$, a B-side $B_S$ and a C-side $C_S$, located opposite an A-vertex $A_V$, a B-vertex $B_V$ and a C-vertex $C_V$, respectively. Sides $A_S$ and $B_S$ are substantially equal in length and side $C_S$ is approximately $2/\sqrt{3}$ times the length of $A_S$ or $B_S$. In a preferred embodiment of the invention, each side comprises a substantially linear strut member. Each of the three vertices includes a different type of vertex fitting capable of fastening respective frame elements to one another.

Figure 2:
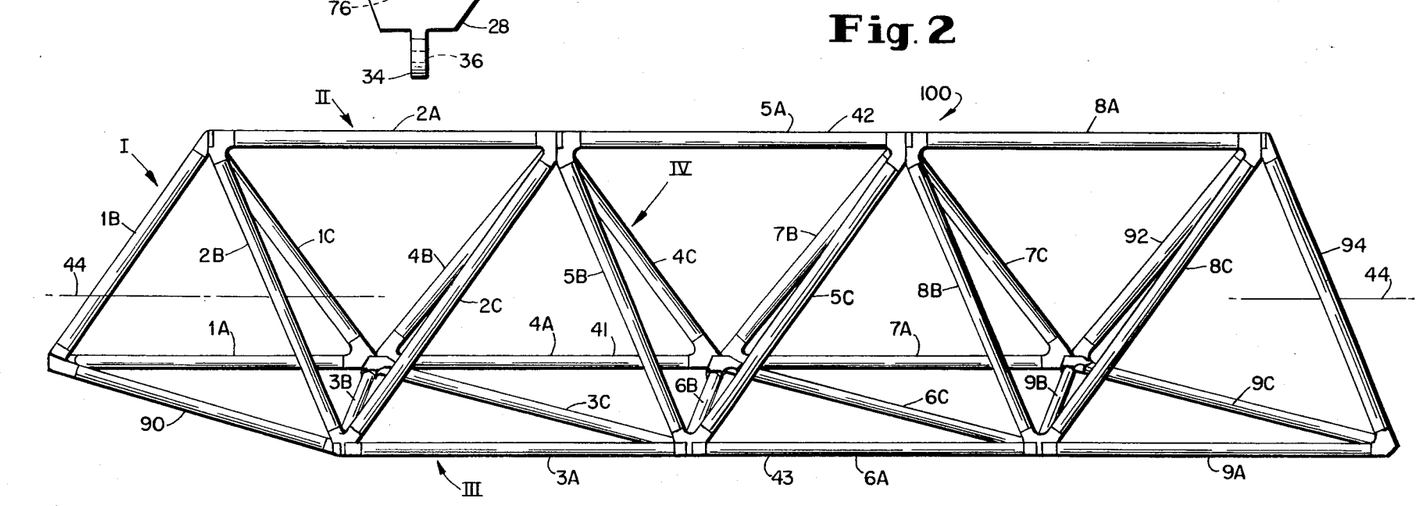
FIG. 2 is a side view of an exemplary completed truss structure.

FIG. 2 shows an exemplary completed truss structure 100 containing nine frame elements for purposes of illustration. The alphanumeric designations corresponding to each frame element in FIG. 2 indicate that element's numerical position in the truss structure, counting from left to right in the drawing. Thus, sides 1A, 1B and 1C designate the A-, B- and C-sides of the first frame element, sides 2A, 2B and 2C designate the second element, and so forth.

Figure 3A:
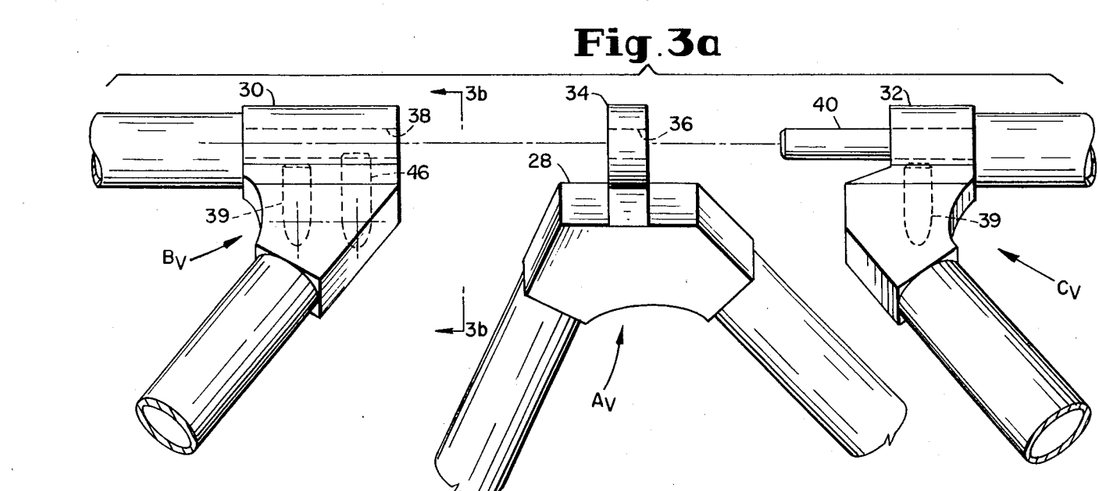
FIGS. 3a and 3b illustrate a preferred truss joint.

FIG. 3a shows an exploded view of a truss joint, i.e. where three frame elements of the truss are joined. Vertex $A_V$ comprises a fitting 28 which includes a flat tab 34 containing a through hole 36. Vertex $B_V$ comprises a fitting 30 which includes a socket 38. Vertex $C_V$ comprises a fitting 32 which has embedded therein a fastening pin 40 sized to fit through hole 36 and socket 38. As shown in FIG. 1, the axis of through hole 36 is parallel to that of side $A_S$. The respective axes of socket 38 and fastening pin 40 are aligned with the axis of side $A_S$.

Figure 3B:
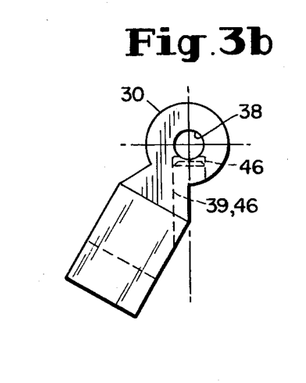

In general, each truss joint comprises A-, B- and C-vertices of three different frame elements fastened together. As seen in FIG. 3a, fastening pin 40 aligns with and first engages through hole 36 in vertex fitting 28 and is then inserted into socket 38 in vertex fitting 30. Also referring to FIG. 3b which shows a sectional view of vertex $B_V$, a lock screw hole 46 communicates between the surface of vertex fitting 30 and socket 38 and is adapted to receive a lock screw, not shown. When tightened, the lock screw is effective to retain fastening pin 40 in socket 38.

Again referring to FIG. 2, completed truss structure 100 is seen to comprise an oblique triangular prism, having three longitudinal edges 41, 42 and 43 parallel to a central axis 44. A right cross-section of the truss structure takes the form of an equilateral triangle. The structure is such that longitudinal edges 41, 42 and 43 consist substantially only of the A-sides of the respective frame elements. The free vertex points at the beginning, i.e. the left hand end, of the truss structure are seen to be joined by an end strut 90, while the free vertex points at the right hand end of the truss structure are joined by end struts 92 and 94. End strut 90 is preferably identical to the strut used for side $C_S$ of a frame element and carries vertex fittings 28 and 30 at its opposite ends. Each of end struts 92 and 94 is preferably identical to the strut used for side $B_S$ which carries vertex fittings 28 and 32 at its opposite ends.

Figure 4:
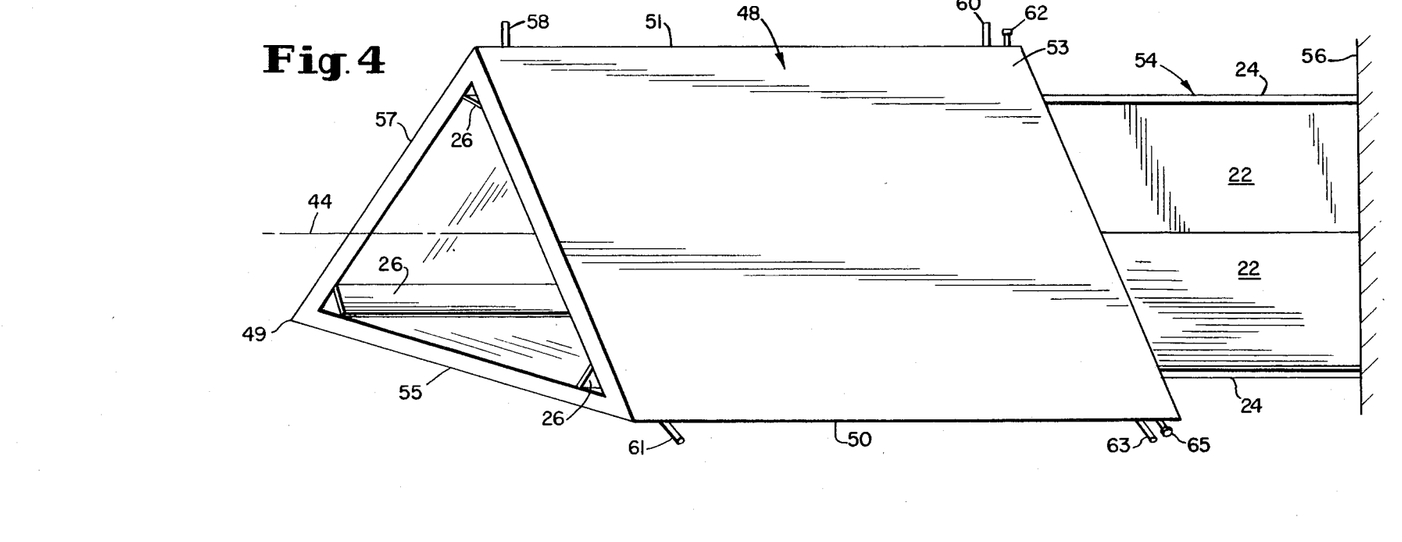
FIG. 4 illustrates a preferred construction fixture in accordance with the present invention.

FIG. 4 shows a construction fixture 48 which has an elongate prism shape and an equilateral triangular right cross section. Three longitudinal fixture edges 49, 50 and 51 are parallel to longitudinal axis 44. The planes defined between the longitudinal fixture edges constitute solid faces in the preferred embodiment of the invention, as shown at 53, 55 and 57. However, where the longitudinal edges are adapted to provide adequate support for frame elements deposited upon fixture 48 during construction of the truss structure, the solid fixture faces can be dispensed with.

In the preferred embodiment, as shown in FIG. 4, the ends of fixture 48 are oblique and parallel to one another. The amount of obliquity is chosen to be substantially the same as for the ends of the truss structure in order to achieve a more efficient fixture shape.

Figure 7:
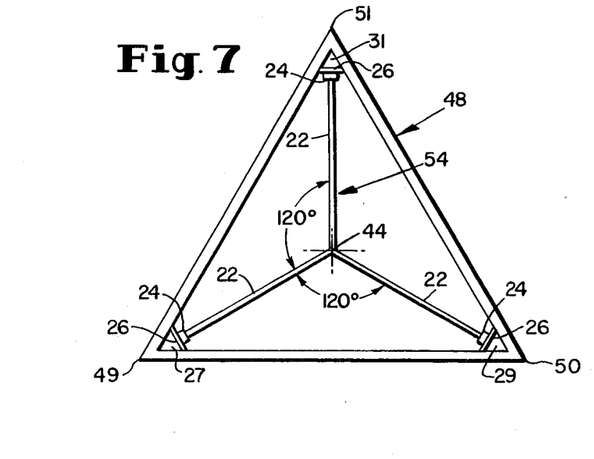
FIG. 7 is a cross-sectional view of the construction fixture of FIG. 5.

Fixture 48 is coaxially disposed on a rigid beam 54 and is axially movable along the beam. As shown in FIG. 7, which is a cross-sectional view of fixture 48, beam 54 includes three radial web members 22 each terminating in a widened track portion 24. Web members 22 are angled 120° relative to each other such that track portions 24 extend to the three vertex regions 27, 29 and 31 of fixture 48. The mutual intersection of members 22 comprises the longitudinal axis of beam 54 which coincides with the common axis 44. A plate 26 bridges each vertex region and extends substantially the entire length of fixture 48. In the preferred embodiment, each plate 26 may be fitted with a rack engaged by a pinion gear, not shown, mounted in each track portion 24 of beam 54. At least one pinion gear may be powered in order to drive fixture 48 relative to beam 54.

Again referring to FIG. 4, during construction, one end of beam 54 is affixed to a location on a reference surface 56, such as a surface of a space craft. A pair of retractable fixture pins is disposed along each of the three longitudinal fixture edges 49, 50 and 51. Pins 58, 60 and 61, 63 only are visible in FIG. 4. When extended, each pair of fixture pins acts to hold two vertices of a frame element, the third vertex being supported by its engagement with the mating vertex of an adjacent frame element or end strut. As a result, the frame element is securely held on fixture 48 during construction. In the preferred embodiment, each fixture pin has an axis which lies along the bisector of the angle formed by the fixture planes adjacent the edge where the pin is located. Thus, pins 58 and 60 are capable of selectively retracting along the bisector of the angle formed by fixture planes 53 and 57.

Figure 5:
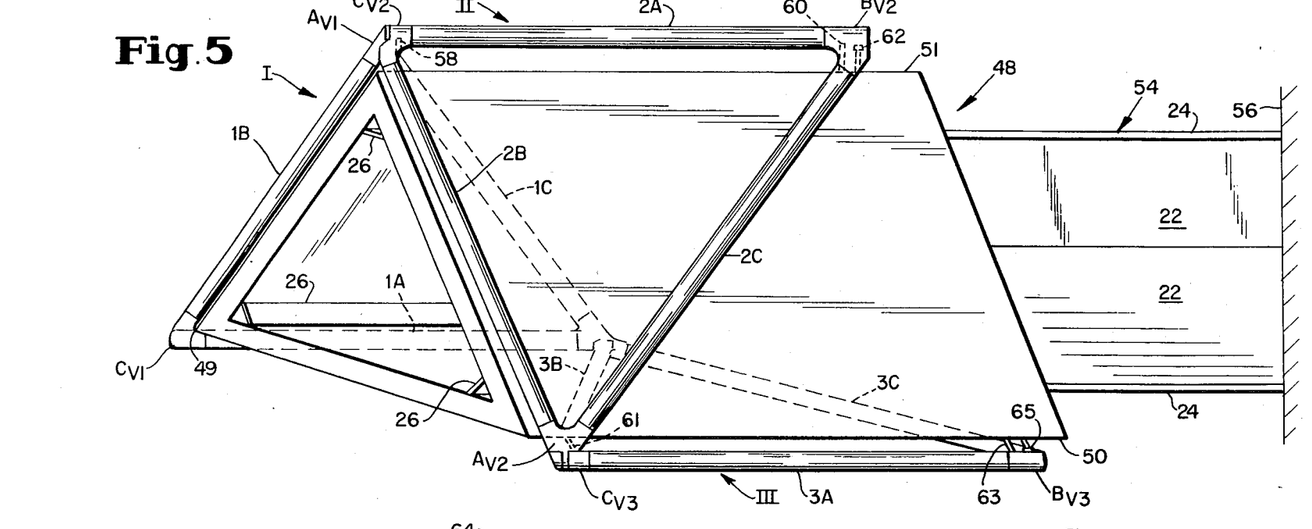
FIG. 5 illustrates the construction fixture together with frame elements positioned thereon.

FIG. 5 shows fixture 48 with three frame elements I, II and III positioned thereon, as will be the case at the beginning of the construction of a truss structure. Each fixture pin, when extended, engages a mating fixture pin hole 39, shown in FIGS. 3a and 3b as being located at the vertex of a suitably positioned frame element. For example, in the arrangement illustrated in FIG. 5, fixture pin 58 extends perpendicularly from edge 51 of fixture 48 to engage the mating fixture pin hole in vertex $C_{v2}$ of the second frame element, designated II and defined by sides 2A, 2B and 2C. Fixture pin 60 likewise extends from fixture edge 51 to engage a mating fixture pin hole in vertex $B_{v2}$ of the second frame element, the latter thus being held in construction position on fixture 48 by fixture pins 58 and 60.

Similarly, fixture pins 61 and 63 extend perpendicularly from fixture edge 50 to engage mating fixture pin holes in vertices $C_{v3}$ and $B_{v3}$, respectively, of the third frame element, designated III and defined by sides 3A, 3B and 3C, which is thus held on fixture 48. The first frame element, designated I, is held on fixture 48 by fixture pins, not visible in FIG. 5, which extend from fixture edge 49. Thus, when the three pairs of fixture pins are all extended, a complete bay, consisting of interconnected frame elements I, II and III, can be held on fixture 48.

A retractable torquing device extends perpendicularly from each longitudinal fixture edge. Torquing devices 62 and 65 are visible in FIGS. 4 and 5, extending from fixture edges 51 and 50, respectively. Torquing device 62 is adapted, when extended as shown, to engage the lock screw at vertex $B_{v2}$, specifically the lock screw located in hole 46 of vertex fitting 30 in FIGS. 1 and 3. This occurs while the second frame element is held in construction position on fixture 48 such that hole 46 is aligned with torquing device 62. Similarly, torquing device 65 is adapted to engage a lock screw in vertex $B_{v3}$ and the lock screw in the first frame element is engaged by a torquing device which is not visible in FIG. 5. The torquing devices are capable of tightening or loosening the lock screw aligned with each device while constructing or disassembling, respectively, the truss structure.

Figure 6:
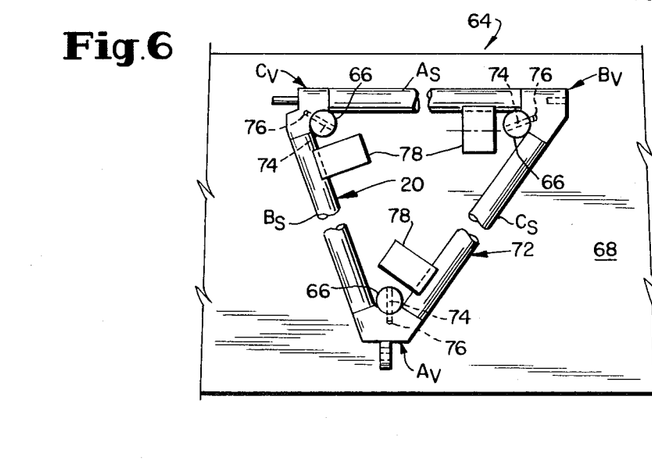
FIG. 6 is a plan view of a frame feed unit in accordance with the present invention.
Figure 8A:
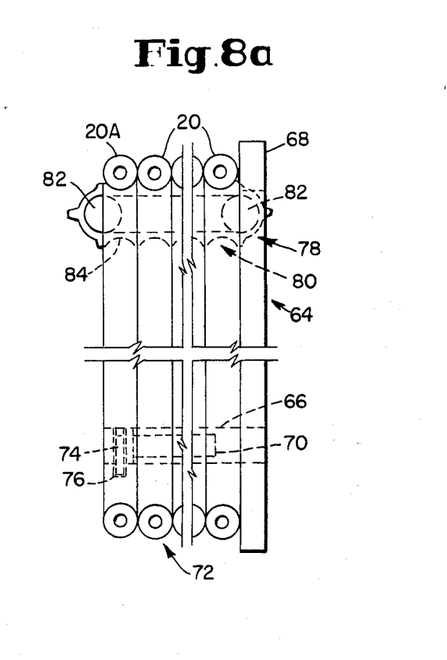
FIGS. 8a and 8b are sectional views of a frame feed unit at different stages during the feeding operation.
Figure 9:
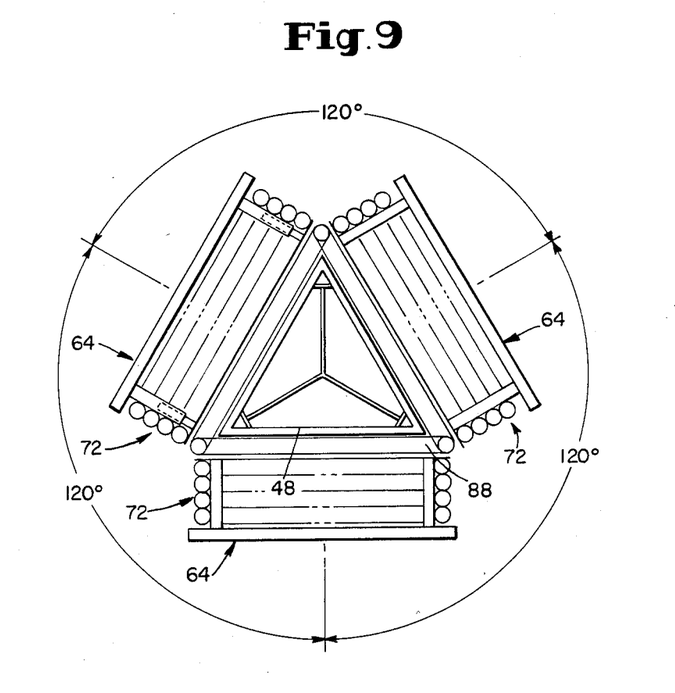
FIG. 9 is a simplified sectional view of the construction fixture and frame feed units.

FIG. 6 is a plan view of a frame feed unit 64 with frame elements 20 stacked thereon. As shown in FIG. 9, a total of three frame feed units is used during construction, spaced 120° from one another around the longitudinal axis of fixture 48. Further, the frame feed units are axially spaced from one another by a distance substantially equal to one-third the length of element side $A_s$. Feed unit 64 comprises three substantially identical telescoping guide posts 66 perpendicularly mounted to base plate 68, as best seen from FIG. 6. The guide posts are located on the base plate in a pattern which conforms to the triangular configuration of elements 20. Also, referring to FIG. 8a, each guide post 66 contains a telescoping shaft 70 and includes means, not shown, for driving shaft 70 to the desired position. Thus, in effect the free end of each guide post (actually the free end of shaft 70) can be extended outward. Guide posts 66 have a length chosen to support a predetermined number of frame elements in a stack 72. The size of the stack carried by the guide posts of the respective frame feed units 64 determines the number of frame elements that can be added, without replenishing the feed units, to the truss structure to be constructed. The free end of each shaft 70 is fitted with a selectively retractable end pin 74. Upon extension, each end pin 74 is adapted to engage a mating vertex hole 76 located on the inside of the vertex fittings at each vertex $A_v$, $B_v$ and $C_v$.

Each feed unit 64 further includes three substantially identical belt units 78, each positioned within stack 72 and mounted on base plate 68 adjacent one guide post 66. As best shown in FIG. 8a, each belt unit 78 includes a belt 80 mounted on a pair of pulleys 82, such that belt 80 is perpendicular to the base plate. In the preferred embodiment of the invention, belt units 78 are free wheeling and no forced driving means are provided. Each belt includes contours 84 which mate with frame elements 20 in stack 72.

Figure 8B:
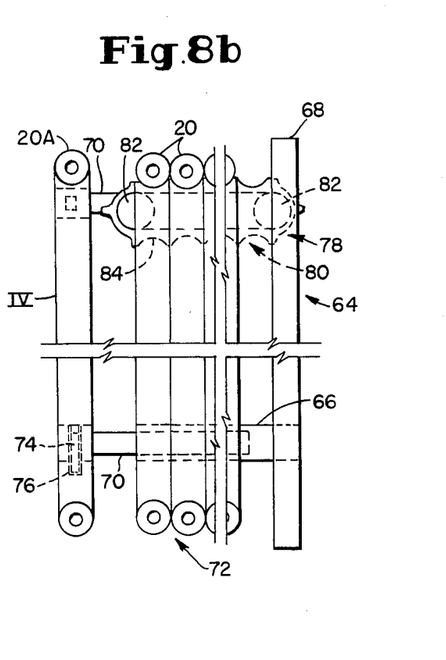

Referring now to FIG. 8b, the selected frame element 20A on top of stack 72, is held by end pins 74. To move frame element 20A away from base plate 68, shafts 70 extend out of guide posts 66 and all three belts 80 rotate by the distance of one contour 84. Belt rotation, due to frame element 20A contacting its proximate contour 84 on each belt 80, causes the remaining elements in the stack, by their contact with the belt contours, to move in unison up toward the free ends of guide posts 66. Conversely, when an element is added to the top of the stack during disassembly of the truss structure, the belts will rotate in the opposite direction and cause the frame elements in the stack to move down on the guide posts toward base plate 68. It will be understood by those skilled in the art, that the terms "up" and "down" are used in a relative sense herein for purposes of explanation and not in their absolute sense.

FIG. 9 provides a simplified sectional view of construction fixture 48, of truss structure 88 thereon and of the relative positions of frame feed units 64 about fixture 48. Each feed unit 64 is disposed, in fixed relationship to reference surface 56, opposite one plane or face of fixture 48, with the stacked elements preferably positioned parallel to the confronting fixture plane.

Referring again to FIGS. 3 and 5, the preferred method of constructing a truss structure commences by manually placing elements I, II and III on different faces of fixture 48, orienting each element with its respective A-side along one longitudinal fixture edge and manually fastening adjacent vertices together. In particular, fastening pin 40 at vertex $C_{v2}$ of element II is joined to through hole 36 at vertex $A_{v1}$ of element I. Further, fastening pin 40 of element III at vertex $C_{v3}$ is joined to through hole 36 at vertex $A_{v2}$ of element II. Each pair of fixture pins, such as 58, 60, is extended to engage and hold elements I, II and III on fixture 48. Joined elements I, II and III form a first bay of the truss structure.

End strut 90, shown in FIG. 2, is now installed to join the free vertex points on the first bay, which consist of the C-vertex of element I and the joined A- and C-vertices of elements II and III, respectively. This is accomplished by letting fastening pin 40 at the C-vertex of element I engage through hole 36 of the A-vertex fitting attached to one end of strut 90. Socket 38 of the B-vertex fitting attached to the other end of strut 90 is fastened to the already joined A- and C-vertices of elements II and III, respectively.

Figure 10A:
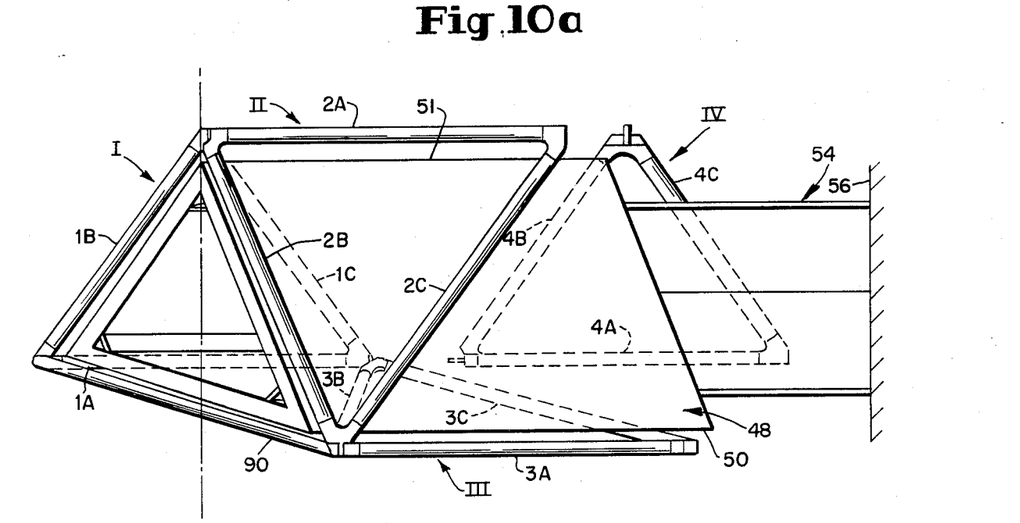
FIGS. 10a and 10b illustrate the fastening operation.

Next, as shown in FIG. 10a, fixture 48 is moved axially to a position in which the feed unit confronting the face of fixture 48, upon which element I is located, is aligned with the position on fixture 48 which element IV, the next to be joined to the truss structure, will occupy. The alignment must be such that fixture 48 is axially displaced in a forward direction, i.e. away from surface 56, by a distance F, where F is approximately equal to the length of fastening pin 40. This will enable element IV to be deposited on the aforesaid fixture face in a manner such that fastening pin 40 of element IV just clears the B-vertex of element I on the fixture.

Next, reference is made to FIG. 8a, specifically with respect to the feed unit which will place element IV on fixture 48. Shafts 70 on the feed unit, with elements 20 stacked thereon, are positioned to align end pins 74 with the vertices of element 20A on top of the stack. To "select" frame element 20A, end pins 74 are extended to engage mating holes 76 in the vertex fittings of the latter element. The simultaneous engagement of holes 76 by end pins 74 at vertices $A_v$, $B_v$ and $C_v$ of the top frame element 20A on stack 72 is effective to "select" element 20A, i.e. to hold it. Next, referring to FIG. 8b, shafts 70 are extended out of guide posts 66 to thereby move element 20A in a direction away from base plate 68 and toward the confronting fixture face. Element 20A, i.e. the fourth element of the truss structure under construction, is thus placed in construction position in the confronting fixture plane, with its A-side aligned with one longitudinal fixture edge. The position of the element, which is hereafter referred to as element IV, is as shown in FIG. 10a.

Figure 10B:
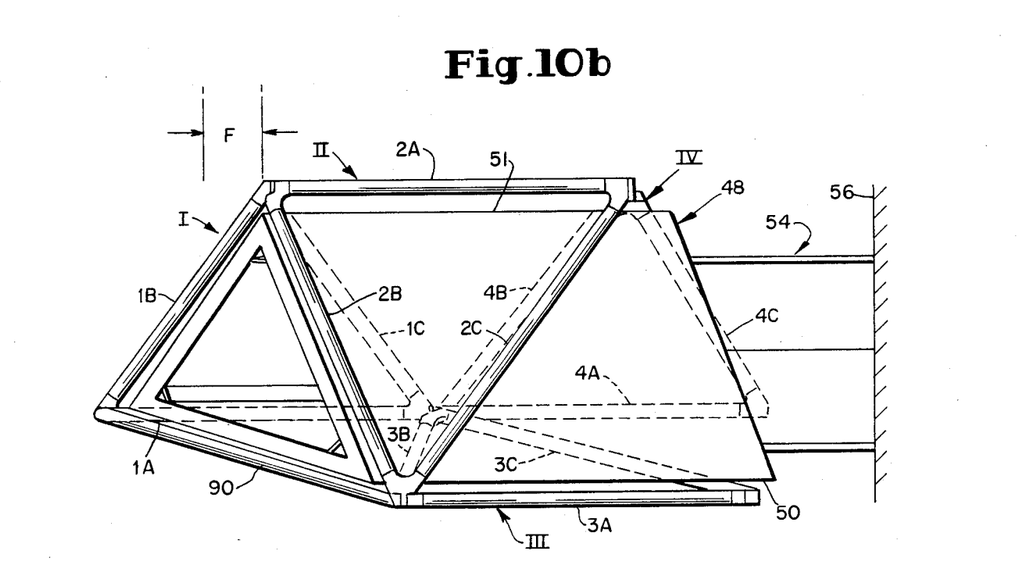

At this point, element IV is positioned in the plane of the confronting fixture face, but is still being held on the free ends of the guide posts by means of end pins 74. Fixture 48 is now moved axially in a backward direction toward reference surface 56 by distance F, as shown in FIG. 10b. This movement of the fixture causes the fastening pin 40 at the C-vertex of element IV to pass first through the through hole 36 at the A-vertex of element III and then into socket 38 at the B-vertex of element I. Next, the torquing device, which is aligned with the lock screw located in the B-vertex fitting of element I, is extended to engage the lock screw and is rotated to tighten it.

Following the last operation, end pins 74 are retracted and shafts 70 are withdrawn from element IV. Fixture 48 is moved axially forward, away from reference surface 56, through distance F and the next frame element can now be installed. The latter operation is carried out by the next feed unit, which is axially spaced from the unit used to install element IV. The steps followed are those outlined above for the installation of element IV and they are automatic in a preferred embodiment of the invention.

Following the installation of the sixth frame element, and each third frame element thereafter, the completed portion of the truss structure is shifted in relation to fixture 48 to expose a portion of fixture 48 where further elements may be added. Fixture 48 has a length at least 30% greater than that of a single bay of the truss structure. This portion of the construction process may also be performed automatically by the apparatus. The axial positions of fixture 48 for this operation are best illustrated in FIG. 11.

Figure 11A:
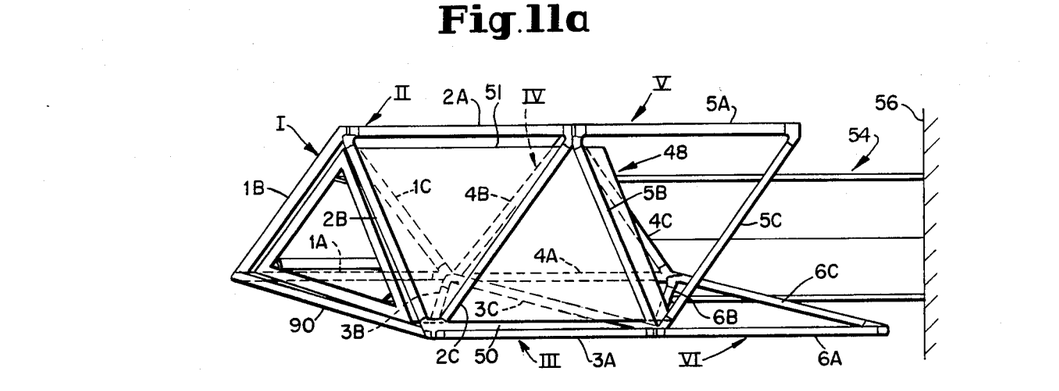
FIGS. 11a, 11b and 11c illustrate truss shifting during the construction of the truss structure.
Figure 11B:
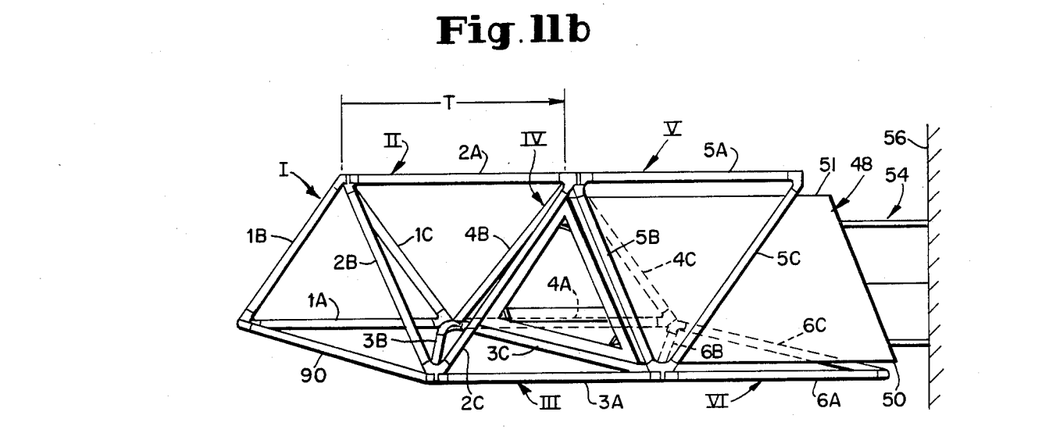

Thus, following the installation of the sixth frame element, fixture 48 is held stationary, as shown in FIG. 11a. Shafts 70 of the pertinent feed unit remain extended, engaging the sixth element. The shafts of the other feed units are now extended to the confronting fixture faces and end pins 74 are extended and engage mating holes 76 in the confronting frame elements.

Next, the fixture pins are retracted to release the hold of fixture 48 on the first bay of the truss structure, i.e. on frame elements I, II and III. While the structure is held by end pins 74 of feed units 64, fixture 48 is now moved axially backward toward reference surface 56 by a distance T, where T is substantially equal to $A_s$, i.e. to the length of an A-side. The new position is shown in FIG. 11b. The fixture pins are now extended to engage the last three frame elements assembled, in the case under consideration elements IV, V and VI. End pins 74 are now retracted and shafts 70 are withdrawn so that the truss structure is now again held solely by fixture 48.

Figure 11C:
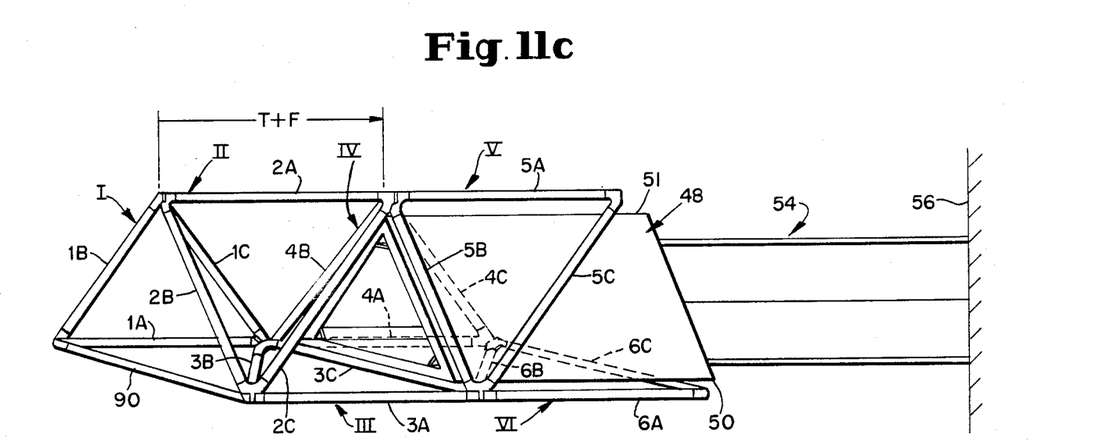

Next, as shown in FIG. 11c fixture 48 is moved axially forward by a distant T+F, carrying with it the truss structure. The fixture is now in position to receive an additional three frame elements for assembly and the automatic procedure described above is repeated to construct a further bay of the truss structure.

The foregoing steps are repeated until the stacks of frame elements have been exhausted and a truss structure of the desired length has been constructed. As a final step, and referring to FIG. 2, two end struts 92, 94 are installed between the free vertex points on the end of the truss structure. Regardless of the number of elements in the completed truss structure, end struts 92, 94 will always be substantially identical to a B-side of a frame element, i.e. one having A- and C-vertex fittings at opposite ends. An N-element truss structure will have three free vertices at its end, the first consisting of the B-vertex of the Nth element, the second consisting of the B-vertex of the N-1 element and the third consisting of the joined A- and B-vertices of the Nth and N-2 elements, respectively. End struts 92 and 94 may either be loaded into the appropriate feed units and automatically installed as part of the construction method, or they may be manually installed. Thereafter, the C-vertex fitting of strut 92 is fastened to the aforesaid third free vertex point and the other end of strut 92, which carries the A-vertex fitting, is fastened to the aforesaid second free vertex point. One end of strut 94, which carries a C-vertex fitting, is fastened to the second free vertex point jointly with one end of strut 92, as set forth above. The other end of strut 94 which carries an A-vertex fitting is fastened to the first free vertex point by means of a fastening pin similar to pin 40, thereby completing the truss structure.

In order to disassemble the truss, the order of the steps of the constuction method described above is substantially reversed and each torquing device is operated to loosen rather than tighten the lock screw in each B-vertex. The guide posts extend and retract in order to carry individual frame elements from the truss structure back to the feed units where the frame elements are accumulated in three stacks.

While the preferred embodiment illustrated and described herein includes an end strut 90 which joins the pair of free vertex points on the first bay, it will be clear that these two free vertex points could instead be fastened to a payload which connects the two points structurally. In either case, the requisite structural integrity and stability are established.

The preferred embodiment herein discloses the use of a pair of end struts 92 and 94 for joining the three free vertex points on the end of the truss structure where construction is completed. However, the truss structure may remain mounted on fixture 48 following the completion of assembly, held thereon by the fixture pins. In the latter case, fixture 48, which itself remains attached through beam 54 to reference surface 56, e.g. to the space ship, supplies the requisite structural integrity at the end of the truss structure mounted thereon. This would be the case, for example, where the truss structure is utilized to deploy a payload such as sensors or solar collectors mounted on the beginning of the first bay.

A clockwise helical structure has been disclosed as a preferred embodiment, i.e. commencing with the first bay, the progress of the sequentially added frame elements follows a clockwise helical course. It will be clear to those skilled in the art that a counterclockwise helical structure may be constructed using substantially the same method and structure disclosed herein.

A construction fixture having an oblique triangular prism shape is preferred herein. However, it will be obvious to those skilled in the art that it is not necessary for the fixture ends to be oblique in order to practice the invention. Though the fixture cross section must conform to that of the truss structure, as a minimum it need only afford suitable length and surface area to enable truss construction by the above-described method.

As disclosed herein, the preferred embodiment illustrated and described utilizes feed units with frame elements stacked thereon. However, the stacks and the associated belt units may be dispensed with, if desired. For example, each feed unit may be fitted with relatively short guide posts and be positioned relative to the construction fixture substantially as in the preferred embodiment of the invention. The frame elements may be supplied individually to each feed unit, e.g. from the space craft by transporting them in a direction parallel to the axis of fixture 48. Thus, each frame element may be introduced into the space between the feed unit and the confronting fixture face. Each frame element in such a method is oriented so as to be substantially parallel to the fixture face which confronts the particular feed unit. The guidepost shafts can then be extended to engage the newly introduced frame element to position it on the confronting fixture face. The balance of the procedure then follows the method described above with respect to the preferred embodiment. One technique for individually supplying the frame elements from a remote point, rather than from a stack, may use a pallet or the like which moves on tracks. The tracks may be mounted on an extended portion of fixture 48 adjacent the space craft.

A major advantage of individually supplying the frame elements is to decouple the size of the completed truss structure from the stack capacity of the feed units. A further advantage is to reduce the volume of space required for the construction apparatus, since stacks are no longer required.

The preferred embodiment herein employs substantially straight fixture pins with which to hold elements on the construction fixture. However, other types of pins may be used. For example, L-shaped pins with one leg perpendicular and the other parallel to a fixture plane could be employed. With such an arrangement, upon extension and rotation of the pin, the parallel leg lies across a portion of the frame element so as to hold the latter.

Another type of fixture pin which may be used is an expandible pin. An expandible pin, commercially available as Expando Pin manufactured by Adjustable Bushing Corporation, is one whose diameter may be expanded or retracted by mechanical operation. Thus, if a substantially straight expandible pin is employed as a fixture pin, its diameter could be expanded after insertion into the mating fixture pin hole at the frame element vertex. This will result in a firm hold on the frame element. With such an arrangement, the diameter of the fixture pin must be reduced prior to pin withdrawal.

Although frame feed units which utilize free wheeling belt units are contemplated, forced driving means for the belts could be used. This is particularly the case where the individual stack sizes are anticipated to be large. Under these conditions, forced belt driving will facilitate the frame element feeding process.

While the preferred embodiment illustrated and described herein comprises specific materials, apparatus and methods, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. Apparatus for assembling an elongate prism-form truss structure from a plurality of planar, congruent, triangular frame elements, and for disassembling said structure, said apparatus comprising:

an elongate prism-form construction fixture defined by first, second and third longitudinal edges parallel to a central longitudinal axis and having a right cross section in the form of an equilateral triangle, said longitudinal fixture edges defining planes therebetween;

means on said fixture for holding a plurality of frame elements deposited thereon;

said structure to be assembled or disassembled conforming substantially to the external configuration of said fixture and including three longitudinal edges parallel to said longitudinal axis, said structure and said fixture being coaxially disposed and being capable of relative axial movement;

each of said frame elements having A-, B- and C-sides located opposite A-, B- and C-vertices, respectively, wherein each of said sides comprises a substantially linear strut, said A- and B-sides of each of said elements being substantially equal in length and said C-side being substantially $2/\sqrt{3}$ times the length of one of the shorter sides;

said apparatus further comprising:

first, second and third frame feed units equidistantly spaced radially from said axis at locations 120° apart around said axis, said frame feed units being axially spaced from one another by a distance substantially equal to one third of said A-side; and said frame feed units including means for feeding said frame elements to predetermined locations in said fixture planes.

2. The apparatus of claim 1 wherein said fixture holding means further comprises selectively retractable pairs of fixture pins, each pair of said fixture pins being mutually spaced from each other and being adapted to hold a frame element on said fixture in the extended fixture pin position and to release said frame element in the retracted fixture pin position.

3. The apparatus of claim 2 wherein each pair of said fixture pins is located near opposite ends of a separate longitudinal fixture edge and is retractable into said fixture; and each of said fixture pins being adapted to engage a mating hole in a frame element in said extended pin position.

4. The apparatus of claim 1 wherein each of said frame elements includes a lock screw at its B-vertex, said lock screw being adapted to tighten a fastening pin received in a socket of said B-vertex for attaching adjacent elements of said truss structure;

said fixture further including:

a plurality of torquing devices each adapted to selectively apply a torque to the lock screw aligned therewith.

5. The apparatus of claim 1 and further including a central beam; and means for coaxially supporting said fixture on said beam for axial movement relative thereto.

6. The apparatus of claim 1, wherein each of said frame feed units further includes:

a base plate;

first, second and third substantially identical telescoping guide posts mounted perpendicularly on said base plate in a pattern conforming to said frame elements, the free ends of said guide posts being jointly adapted to hold a single frame element parallel to its confronting fixture plane; and said feeding means including means for selectively extending said telescoping guide posts in unison to deposit the frame element held on said free ends in said predetermined location in said confronting fixture plane, or to withdraw said frame element therefrom by retracting said guide posts in unison.

7. The apparatus of claim 6, wherein each of said triangular elements includes a hole at each vertex thereof, said holes opening to the inside of the triangle defined by said element;

the length of said guide posts being chosen to hold a predetermined number of said frame elements in a stack on said base plate;

said free ends of said guide posts each including a selectively retractable end pin adapted upon extension thereof to engage one of said vertex holes so as to select the top frame element of said stack; and first, second and third belt units perpendicularly mounted on said base plate, each of said belt units being located proximate one of said guide posts and including a belt contoured to engage individual frame elements of said stack, said belts being adapted to move successive frame elements in said stack either toward or away from said free guide post ends when said guide posts are extended or withdrawn respectively.

8. A method for constructing an elongate prism-form truss structure from a plurality of planar, congruent, triangular frame elements, said structure being defined by first, second and third longitudinal edges parallel to a central longitudinal axis and having a right cross section in the form of an equilateral triangle, each of said frame elements having A-, B- and C-sides located opposite A-, B- and C-vertices, respectively, said A- and B-sides of each of said elements being substantially equal in length and said C-side being substantially $2/\sqrt{3}$ times the length of one of the shorter sides, at least some of said elements being fed from first, second and third feed points radially spaced from said axis substantially 120° apart and axially spaced from one another by substantially one third the length of said A-side;

said method comprising the steps of:

(1) assembling first, second and third frame elements around said axis by attaching the C-vertex of said second element to the A-vertex of said first element and the C-vertex of said third element to the A-vertex of said second element;

(2) feeding a fourth frame element from said first feed point toward said axis;

(3) fastening the C-vertex of said fourth element to the A-vertex of said third element and to the B-vertex of said first element;

(4) feeding subsequent frame elements toward said axis in sequence from successive feed points; and (5) repeating step (3) for each of said subsequent elements by fastening the C-vertex of the Nth element being fed to the A-vertex of the N-1 element and to the B-vertex of the N-3 element until the desired number of said frame elements have been joined.

9. The method of claim 8 wherein said vertices are hingedly fastened together and wherein, in steps (3) and (5), the C-vertex of the Nth element being fed is first fastened to the A-vertex of the N-1 element, and the joined vertices are subsequently fastened to the B-vertex of the N-3 element.

10. The method of claim 9 wherein said frame elements are fed from first, second and third stacks of said elements located at said first, second and third feed points respectively.

11. The method of claim 10 wherein said truss structure is constructed around a coaxially positioned, elongate, prism-shaped construction fixture, said fixture conforming substantially to the interior space of said truss structure and including first, second and third longitudinal edges parallel to and proximate the like-numbered longitudinal edges of said truss structure to be constructed, said longitudinal fixture edges defining planes therebetween each confronting one of said stacks, and said fixture and said truss structure being capable of relative axial movement;

each of said feeding steps further including placing the element currently being fed into a construction position on said fixture wherein said element is disposed in said confronting fixture plane with its A-side parallel to one of said longitudinal fixture edges.

12. The method of claim 11 wherein each of said frame elements includes A-, B- and C-vertex fittings at the correspondingly designated vertices, and said A-, B- and C-sides comprise linear A-, B- and C-struts, respectively, joining said vertex fittings;

said A-vertex fitting including a tab extending outwardly therefrom, said tab including a through hole having an axis substantially parallel to said A-side;

said B-vertex fitting including a substantially cylindrical socket aligned with said A-side;

said C-vertex fitting including a fastening pin extending outwardly therefrom and having an axis aligned with said A-side; and each of said fastening steps further including inserting the fastening pin of the Nth element in construction position into the through hole of the A-vertex fitting of the N-1 element to be joined.

13. The method of claim 12 wherein said truss structure is constructed of successive bays each including three frame elements; and said method further including the step of interconnecting the pair of free vertex points of the first bay of said multi-bay truss structure with a substantially linear strut.

14. The method of claim 13 wherein said free vertex points of said first bay comprise a C-vertex fitting of said first element and the joined A- and C-vertex fittings of said second and third elements respectively;

said interconnecting step including:

fastening one end of a C-strut to the C-vertex fitting of said first element by means of an A-vertex fitting; and fastening the opposite end of said C-strut to said joined A- and C-vertex fittings by means of a B-vertex fitting.

15. The method of claim 12 and further including, following the completion of an N-element truss structure, the step of:

interconnecting each pair of free vertex points with substantially linear struts.

16. The method of claim 15 wherein the interconnection of the free vertex points at the end of said truss structure includes the steps of:

fastening one end of a first B-strut by means of a C-vertex fitting to the joined A- and B-vertex fittings of the Nth and N-2 elements respectively of said truss structure;

fastening the opposite end of said first B-strut by means of an A-vertex fitting to the B-vertex fitting of the N-1 element of said truss structure;

fastening one end of a second B-strut by means of an A-vertex fitting to the B-vertex fitting of said Nth element; and fastening the opposite end of said second B-strut by means of a C-vertex fitting to the junction of said B- and A-vertex fittings of said N-1 element and said opposite end of said first B-strut, respectively.

17. The method of claim 16 wherein the interconnection of the free vertex points at the beginning of said truss structure includes the steps of:

fastening one end of a C-strut by means of an A-vertex fitting to the C-vertex fitting of said first element; and fastening the opposite end of said C-strut by means of a B-vertex fitting to the joined A- and C-vertex fittings of said second and third elements, respectively.

18. The method of claim 12 wherein each of said fastening steps further includes inserting said fastening pin of the Nth element in construction position into the socket of the B-vertex fitting of the N-3 element being fastened to the previously joined Nth and N-1 elements.

19. The method of claim 18 wherein each of said B-vertex fittings further includes a screw hole extending into said socket to said fastening pin, and a lock screw engaging said screw hole; and wherein steps (3) and (5) each further include tightening said lock screw to secure said fastening pin in said socket after all three vertex fittings have been joined.

20. The method of claim 19 wherein said construction fixture includes a plurality of torquing devices at predetermined locations along the longitudinal edges of said fixture, said locations being chosen such that one of said torquing devices is always in alignment with and proximate to the lock screw of the frame element currently in construction position; and wherein steps (3) and (5) include tightening said lock screw by applying a torquing force thereto with said aligned torquing device.

21. The method of claim 20 wherein said first, second and third stacks are mounted on first, second and third frame feed units, respectively, each of said feed units comprising a base plate and substantially identical telescoping guide posts mounted perpendicularly thereon, each of said guide posts being adapted to selectively extend in length, said guide posts being positioned on said plate in a pattern conforming to said frame elements and being capable of holding a predetermined number of said frame elements in stacked relationship; and wherein each of said feeding steps further comprises:

selecting the top frame element of said stack with the free ends of said guide posts;

extending said guide posts to place said selected element into said construction position; and withdrawing said guide posts from said selected element after torquing of said lock screw is completed.

22. The method of claim 21 wherein said truss structure is constructed of successive bays each including three frame elements, said fixture further including frame element holding means;

said method further comprising the steps of:

retaining the first bay constructed by step (1) on said fixture with said holding means;

axially moving said fixture following step (1) to a position axially displaced in a forward direction by a distance F from a point opposite the stack on which said fourth element is held, where the distance F is sufficient to clear the fastening pin of said fourth element;

step (3) further including the operation of moving said fixture in a backward axial direction through said distance F to insert said last recited fastening pin into the through hole of said third element and subsequently into the socket of said first element to thereby join the vertex fittings of said last recited elements; and moving said fixture in said forward and backward axial directions by said distance F preceding and following, respectively, each performance of step (4).

23. The method of claim 22 wherein said fixture has a length at least 30% greater than the length of a single bay;

said method further including, following the fastening of the sixth frame element of said truss structure and upon the completion of each bay thereafter, the steps of:

simultaneously extending the guide posts of each of said first and second feed units while said third feed unit guide posts remain extended to cause all of said free guide post ends to simultaneously engage the three frame elements of the last bay constructed;

disengaging said fixture holding means from the bay immediately preceding said last-constructed bay;

moving said fixture in a backward axial direction by a distance T with respect to said truss structure, where said distance T is substantially equal in length to said A-side of an element;

engaging said last-constructed bay with said holding means;

withdrawing said guide posts from said last constructed bay; and moving said fixture in a forward axial direction through a distance T+F;

whereby a section of said fixture becomes available for the addition of a further bay to the existing truss structure.

24. The method of claim 8 wherein, commencing with said fourth element, said elements are fed from first, second and third frame feed units located at said first, second and third feed points, respectively, each of said feed units comprising a base plate and substantially identical telescoping guide posts mounted perpendicularly thereon, each of said guide posts being selectively adapted to extend in length, said guide posts being positioned in a pattern conforming to said frame elements; and said truss structure being constructed around a coaxially positioned, elongate, prism-shaped construction fixture conforming substantially to the interior space of said truss structure, said fixture including first, second and third longitudinal edges parallel to and proximate the like-numbered longitudinal edges of said truss structure to be constructed, said longitudinal fixture edges defining planes therebetween each confronting one of said feed units, and said fixture and said truss structure being capable of relative axial movement;

each of said steps of feeding a frame element further comprising:

introducing said frame element between one of said frame feed units and the confronting fixture plane positioned substantially parallel to said fixture plane and with a predetermined orientation relative to said guide posts;

partially extending said guide posts to engage said frame element with the free ends of said posts; and fully extending said guide posts to place said element into said confronting fixture plane with the A-side of said element substantially parallel to one of said longitudinal fixture edges.

* * * * *